United States Patent
Wang et al.

(10) Patent No.: US 8,175,735 B2
(45) Date of Patent: May 8, 2012

(54) SYSTEM AND METHOD OF MULTI-OBJECTIVE CAPACITY PLANNING IN TFT-LCD PANEL MANUFACTURING INDUSTRY

(75) Inventors: Kung-Jeng Wang, Taipei County (TW); Shih-Min Wang, Taipei County (TW); Chin-Min Lin, Taoyuan County (TW)

(73) Assignee: National Taiwan University of Science and Technology, Taipei (TW)

( * ) Notice: Subject to any disclaimer, the term of this patent is extended or adjusted under 35 U.S.C. 154(b) by 305 days.

(21) Appl. No.: 12/568,687

(22) Filed: Sep. 29, 2009

(65) Prior Publication Data
US 2010/0241263 A1     Sep. 23, 2010

(30) Foreign Application Priority Data
Mar. 17, 2009   (TW) ................ 98108623 A

(51) Int. Cl.
G06F 19/00 (2006.01)
G06F 17/50 (2006.01)
(52) U.S. Cl. ............... 700/103; 700/100; 700/121
(58) Field of Classification Search .......... 700/97, 700/103, 108, 99, 100, 106, 107, 121, 102; 705/7.37
See application file for complete search history.

(56) References Cited

U.S. PATENT DOCUMENTS

| | | | |
|---|---|---|---|
| 5,630,070 A | 5/1997 | Dietrich et al. | |
| 6,611,735 B1 | 8/2003 | Henly et al. | |
| 7,092,775 B2 | 8/2006 | Nomoto et al. | |
| 7,295,956 B1 | 11/2007 | Ruetsch | |
| 7,536,364 B2 | 5/2009 | Subbu et al. | |
| 2005/0187846 A1 | 8/2005 | Subbu et al. | |
| 2010/0312372 A1* | 12/2010 | Wang et al. | 700/102 |

OTHER PUBLICATIONS

Lin et al. "A Capacity Planning Model in the TFT-LCD Production Chain" IEEE IE&EM 2009, 6 pages.*

* cited by examiner

*Primary Examiner* — Albert Decady
*Assistant Examiner* — Steven Garland
(74) *Attorney, Agent, or Firm* — Jianq Chyun IP Office

(57) ABSTRACT

A system and a method of multi-objective capacity planning in the thin film transistor liquid crystal display (TFT-LCD) panel manufacturing industry are provided. The system includes a capacity planning module and a multi-objective planning module. In the present method, a capacity planning plan corresponding to different objective is evaluated by the capacity planning module. A set of constraints of each objective is established by the multi-objective planning module according to characteristic parameters, so as to optimize the objective. Then, the optimized objectives are drawn into a graph to select an appropriate capacity planning plan.

9 Claims, 5 Drawing Sheets

| Output \ Objective | To minimize glass substrate loss area | To maximize throughput |
|---|---|---|
| Glass substrate loss area | 833,940 | 1,070,108 |
| Throughput | 37,567,240 | 69,903,063 |

FIG. 3A

| Throughput limit | Throughput to full-load production | Glass substrate loss area | Normalized production idleness ratio | Normalized glass substrate loss ratio |
|---|---|---|---|---|
| 37,567,240 | 32,335,823 | 833,940 | 0.00 | 1.00 |
| 38,739,707 | 31,163,356 | 833,940 | 0.04 | 1.00 |
| 39,000,000 | 30,903,063 | 834,318 | 0.04 | 1.00 |
| 40,000,000 | 29,903,063 | 835,769 | 0.08 | 0.99 |
| 41,000,000 | 28,903,063 | 837,316 | 0.11 | 0.99 |
| ⋮ | ⋮ | ⋮ | ⋮ | ⋮ |
| 68,000,000 | 1,903,063 | 939,434 | 0.94 | 0.55 |
| 69,000,000 | 903,063 | 979,056 | 0.97 | 0.39 |
| 69,903,063 | 0 | 1,070,108 | 1.00 | 0.00 |

FIG. 3B

| Glass substrate loss area limit | Throughput | Throughput to full-load production | Normalized glass substrate loss ratio | Normalized production idleness ratio |
|---|---|---|---|---|
| 1,079,965 | 69,903,063 | 0 | 0.00 | 1.00 |
| 1,050,000 | 69,861,697 | 41,366 | 0.12 | 1.00 |
| 1,040,000 | 69,838,275 | 64,788 | 0.16 | 1.00 |
| 1,030,000 | 69,814,854 | 88,210 | 0.20 | 1.00 |
| 1,020,000 | 69,791,432 | 111,631 | 0.24 | 1.00 |
| 1,010,000 | 69,695,299 | 207,765 | 0.28 | 0.99 |
| 1,000,000 | 69,527,839 | 375,224 | 0.33 | 0.99 |
| ⋮ | | | | |
| 850,000 | 48,838,613 | 21,064,451 | 0.94 | 0.32 |
| 840,000 | 42,678,323 | 27,224,741 | 0.98 | 0.13 |
| 833,940 | 38,739,709 | 31,163,354 | 1.00 | 0.00 |

FIG. 3C

SYSTEM AND METHOD OF MULTI-OBJECTIVE CAPACITY PLANNING IN TFT-LCD PANEL MANUFACTURING INDUSTRY

CROSS-REFERENCE TO RELATED APPLICATION

This application claims the priority benefit of Taiwan application serial no. 98108623, filed on Mar. 17, 2009. The entirety of the above-mentioned patent application is hereby incorporated by reference herein and made a part of specification.

BACKGROUND OF THE INVENTION

1. Field of the Invention

The present invention relates to a system and a method of capacity planning, and particularly, to a system and a method of multi-objective capacity planning in the panel manufacturing industry.

2. Description of Related Art

In recent years, the conventional cathode ray tube (CRT) products have been gradually replaced by thin film transistor (TFT) liquid crystal displays (LCDs). TFT-LCD manufacturers have to increase their production capacities to fulfil the increasing market demand.

The capacity planning in TFT-LCD panel manufacturing industry has to balance between multiple objectives. For example, the business sector expects to maximize the throughput, while the production sector focuses on the effective utilization of glass substrate.

Accordingly, how to obtain an appropriate multi-objective capacity planning is one of the major issues in today's TFT-LCD panel manufacturing industry.

SUMMARY OF THE INVENTION

The present invention is directed to a multi-objective capacity planning system in the TFT-LCD panel manufacturing industry, wherein a graph illustrating the relationship between multiple conflictive objectives is provided such that an appropriate capacity planning plan can be selected.

The present invention is directed to a multi-objective capacity planning method in the TFT-LCD panel manufacturing industry, wherein a graph illustrating the relationship between multiple conflictive objectives is provided such that an appropriate capacity planning plan can be selected.

The present invention provides a multi-objective capacity planning system in the TFT-LCD panel manufacturing industry. The multi-objective capacity planning system includes an input module, a capacity planning module, a multi-objective planning module, and an output module. The input module inputs characteristic parameters of the TFT-LCD panel manufacturing industry. The capacity planning module provides a first objective and a second objective, wherein the first objective is to minimize a glass substrate loss area, and the second objective is to maximize the throughput. The multi-objective planning module provides a set of constraints of the first objective and a set of constraints for the second objective respectively, wherein the first set of constraints is a lower limit of the throughput, and the second set of constraints is an upper limit of the glass substrate loss area. The capacity planning optimization module respectively calculates outputs of the first objective and outputs of the second objective. The output module respectively draws a first curve and a second curve in a graph according to the outputs of the first objective and the outputs of the second objective and selects an output on the boundaries of the area enclosed by the first curve, the second curve, and the axes of the graph.

According to an embodiment of the present invention, the capacity planning module includes a capacity evaluation module, a remaining capacity evaluation module, a qualified product quantity conversion module, a demand fulfillment evaluation module, and a substrate loss evaluation module. The capacity evaluation module limits an actual capacity to be smaller than or equal to a theoretical capacity. The remaining capacity evaluation module evaluates a remaining capacity. The qualified product quantity conversion module calculates qualified product quantity according to the production yield. The demand fulfillment evaluation module limits the qualified product quantity to be greater than or equal to a market demand. The substrate loss evaluation module evaluates the glass substrate loss area according to the throughput and a substrate cutting utilization ratio.

According to an embodiment of the present invention, the multi-objective planning module includes a throughput constraint module and a substrate loss constraint module. The throughput constraint module limits the throughput to be greater than or equal to the lower limit in the first objective. The substrate loss constraint module limits the glass substrate loss area to be smaller than or equal to the upper limit in the second objective.

The present invention further provides a multi-objective capacity planning method in the TFT-LCD, panel manufacturing industry. First, multiple characteristic parameters of the TFT-LCD panel manufacturing industry are input. Then, a first objective and a second objective are provided, and a throughput and a raw material input of a panel manufacturing factory are respectively evaluated according to the characteristic parameters, wherein the first objective is to minimize a glass substrate loss ratio of the panel manufacturing factory, and the second objective is to maximize the throughput of the panel manufacturing factory. Next, a set of constraints of the first objective and a set of constraints of the second objective are established, wherein the first set of constraints is a lower limit of the throughput, and the second set of constraints is an upper limit of the glass substrate loss ratio. After that, the first objective and the second objective are respectively calculated according to the first set of constraints and the second set of constraints. Finally, a first curve and a second curve are respectively drawn in the graph according to the outputs of the first objective and the outputs of the second objective, and an output is selected on the boundaries of the area enclosed by the first curve, the second curve, and the axes of the graph.

According to an embodiment of the present invention, in the step of calculating the outputs of the first objective, by limiting the throughput to be greater than or equal to the lower limit, the glass substrate loss area corresponding to different throughput is evaluated until the actual capacity is greater than the theoretical capacity or the qualified product quantity is smaller than the market demand. In the step of calculating the outputs of the second objective, by limiting the glass substrate loss area to be smaller than or equal to the upper limit, the throughput corresponding to different glass substrate loss area is evaluated until the actual capacity is greater than the theoretical capacity or the qualified product quantity is smaller than the market demand.

As described above, the present invention provides a system and a method of multi-objective capacity planning, wherein a graph for illustrating the relationship between multiple conflictive objectives is provided such that an optimal capacity planning plan can be selected.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 3A~3C are diagrams illustrating capacity planning optimization results according to an embodiment of the present invention.

DESCRIPTION OF THE EMBODIMENTS

Figure 1:
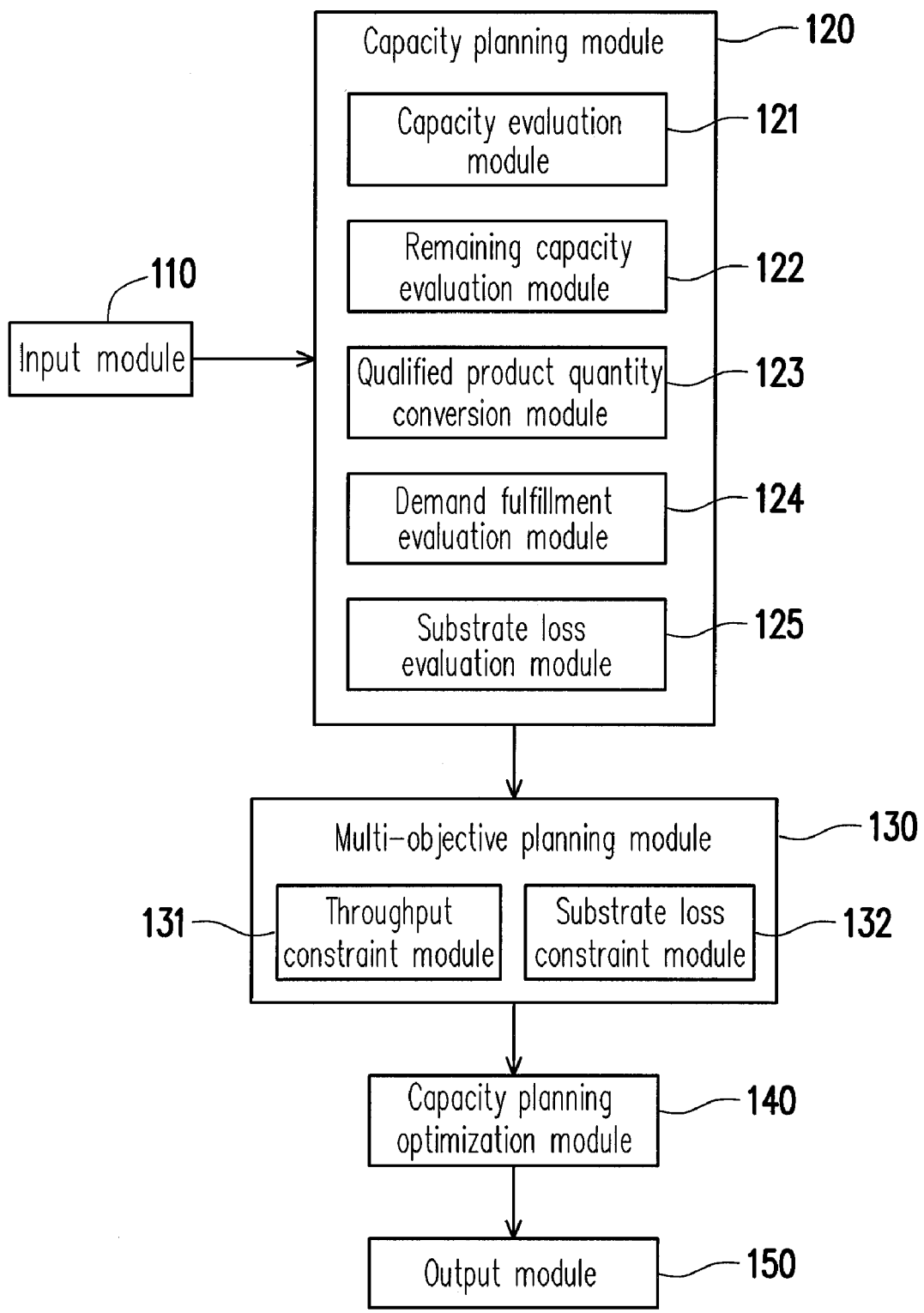
FIG. 1 is a block diagram of a multi-objective capacity planning system according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

In the TFT-LCD manufacturing industry, the objective to maximize throughput conflicts with the objective to minimize the cutting waste of glass substrate. The present invention provides a system and a method of capacity planning in the TFT-LCD manufacturing industry such that an appropriate capacity planning plan can be selected among multiple conflictive objectives.

FIG. 1 is a block diagram of a multi-objective capacity planning system according to an embodiment of the present invention. Referring to FIG. 1, the multi-objective capacity planning system 100 includes an input module 110, a capacity planning module 120, a multi-objective planning module 130, a capacity planning optimization module 140, and an output module 150. In the present embodiment, the multi-objective capacity planning system 100 may be a program written in a computer programming language and executed by a computer, and the modules will be respectively described in detail below.

The input module 110 inputs characteristic parameters of the TFT-LCD manufacturing industry into the capacity planning module 120. In the present embodiment, the input module 110 may be a user interface for the user to input various parameters.

The characteristic parameters include the theoretical capacity, market demand, production yield, substrate cutting utilization ratio, substrate economic cutting number, capacity weights of different products, and assignment feasibilities of different products in each factory.

For the convenience of description, foregoing industry characteristic parameters will be denoted with symbols thereinafter. The symbol p represents a production period, i represents a factory index, j represents a product size, $e_{p,i}$ represents the theoretical capacity of a factory i during a period p, $d_{p,j}$ represents the market demand of a product having a size j during period p, and $a_{i,j}$ represents the allocation feasibility of a product having a size j in factory i.

The symbol $yd_{p,j}$ represents the qualified product yield of a product having a size j during a period p. The symbol $f_{i,j}$ represents the substrate cutting utilization ratio of a product having a size j in the factory i.

The symbol $cn_{i,j}$ represents the economic cutting ratio of a product having a size j in factory i. The symbol $k_{i,j}$ represents the product weight of a product having a size j in factory i. Substantially, when a capacity planning is carried out, a specific product is set as a standard for measuring capacity, and the capacities of other products are evaluated based on the capacity of this specific product.

When the input module 110 receives the characteristic parameters, it inputs the characteristic parameters into the capacity planning module 120.

The capacity planning module 120 provides a first objective and a second objective and respectively evaluates a panel throughput and a substrate input of the manufacturing factory according to the characteristic parameters.

The first objective and the second objective conflict with each other. The first objective is to minimize the glass substrate loss area of the panel manufacturing factory, and the second objective is to maximize the throughput of the panel manufacturing factory.

In addition, the capacity planning module 120 establishes sub-modules according to the characteristic parameters. These sub-modules include a capacity evaluation module 121, a remaining capacity evaluation module 122, a qualified product quantity conversion module 123, a demand fulfillment evaluation module 124, and a substrate loss evaluation module 125.

The capacity evaluation module 121 limits an actual capacity to be smaller than or equal to the theoretical capacity.

$$\sum_j (a_{i,j} \times Y_{p,i,j} \times k_{i,j}) \le e_{p,i} + E_{p,i}.$$

In foregoing expression, $Y_{p,i,j}$ represents the throughput (including qualified product quantity and unqualified product quantity) of a product having a size j in factory i during period p, $E_{p,i}$ represents the remaining capacity of a previous production period, and $e_{p,i}$ represents the theoretical capacity of the current production period.

The remaining capacity evaluation module 122 evaluates the remaining capacity during the current production period, so as to add the remaining capacity to the theoretical capacity of the later production period. Because one characteristic of the panel manufacturing industry is to manufacture products in advance, if the remaining capacity of a previous production period exceeds the market demand of the current production period, the remaining capacity can be used for fulfilling the future market demand.

$$E_{p,i} = E_{p-1,i} + e_{p-1,i} - \sum_j (a_{i,j} \times Y_{p,i,j}).$$

In foregoing expression, $E_{p,i}$ represents the remaining capacity in factory i during period p.

The qualified product quantity conversion module 123 evaluates the qualified product quantity of the throughput according to the qualified product yield.

$$Y_{p,i,j} \times yd_{p,j} = X_{p,i,j}.$$

In foregoing expression, $X_{p,i,j}$ represents the number of qualified products having a size j in factory i during period p.

The demand fulfillment evaluation module 124 limits the qualified product quantity to be greater than or equal to the market demand.

$$\sum_i (a_{i,j} \times Y_{p,i,j} \times cn_{i,j}) \times yd_{p,j} \geq d_{p,j}.$$

The substrate loss evaluation module 125 evaluates the glass substrate loss area based on the throughput, the substrate cutting utilization ratio, and the standard size of the glass substrate in each factory during the current period.

$$H_{p,i,j} = X_{p,i,j} \times (1-f_{i,j}) \times g_i.$$

In foregoing expression, $H_{p,i,j}$ represents the glass substrate loss area of a product having a size j in factory i during period p, and $g_i$ represents the standard size of the glass substrate in factory i.

Accordingly, a plan with larger substrate cutting utilization is selected to minimize the glass substrate loss area. On the other hand, under the second objective, a product with smaller capacity weight and a larger throughput value are selected to maximize the throughput.

The multi-objective planning module 130 respectively provides a first set of constraints and a second set of constraints to respectively limit the first objective and the second objective after executing the capacity planning module 120. Herein the first set of constraints is the lower limit of the throughput, and the second set of constraints is the upper limit of the glass substrate loss area. The multi-objective planning module 130 includes a throughput constraint module 131 and a substrate loss constraint module 132.

The throughput constraint module 131 limits the throughput to be greater than or equal to a lower limit in the first objective.

$$\sum_p \sum_i \sum_j (a_{i,j} \times X_{p,i,j} \times cn_{i,j}) \geq= \text{lower limit}$$

The substrate loss constraint module 132 limits the glass substrate loss area to be smaller than or equal to an upper limit in the second objective.

$$\sum_p \sum_i \sum_j H_{p,i,j} \leq= \text{upper limit}$$

The capacity planning optimization module 140 respectively calculates the outputs of the first objective and the outputs of the second objective according to the first set of constraints and the second set of constraints by using a optimization tool.

The output module 150 respectively draws a first curve and a second curve in a graph according to the outputs of the first objective and the outputs of the second objective. The output module 150 provides a graph for illustrating the relationship between conflictive objectives explicitly, so that a decision-maker can selects an output on the boundaries of the area enclosed by the first curve, the second curve, and the axes of the coordinate graph.

Figure 2:
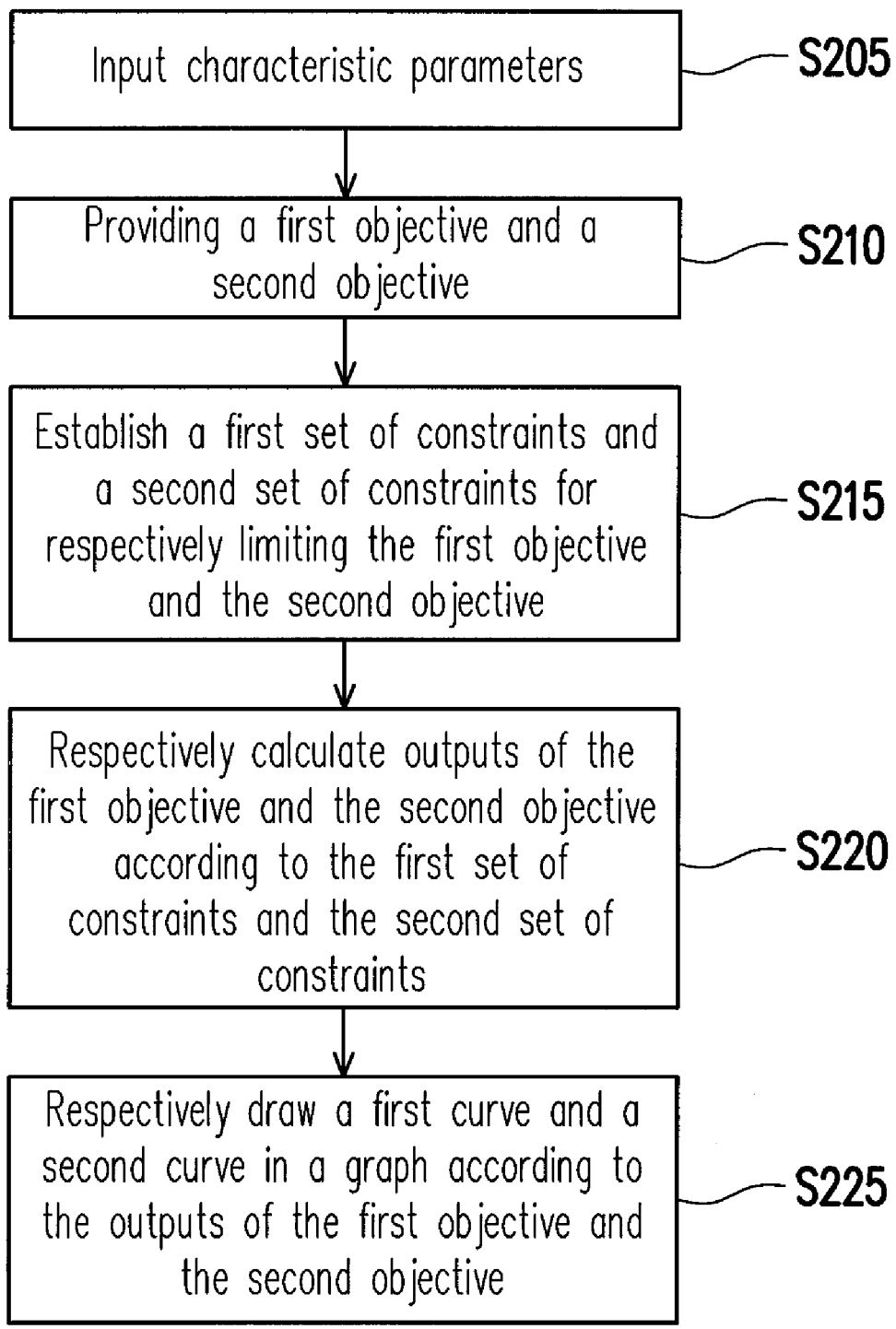
FIG. 2 is a flowchart of a multi-objective capacity planning method in the TFT-LCD panel manufacturing industry according to an embodiment of the present invention.

Below, a multi-objective capacity planning method in the TFT-LCD panel manufacturing industry will be described by referring to the multi-objective capacity planning system 100 described above. FIG. 2 is a flowchart of a multi-objective capacity planning method according to an embodiment of the present invention. Referring to both FIG. 1 and FIG. 2, first, in step S205, the input module 110 inputs characteristic parameters of the panel manufacturing factory into the capacity planning module 120, wherein the characteristic parameters includes a theoretical capacity, a market demand, an allocation feasibility, a qualified product yield, a substrate cutting utilization ratio, a substrate economic cutting number, and a capacity weight.

Then, in step S210, the capacity planning module 120 provides a first objective and a second objective according to the characteristic parameters input by the input module 110, wherein the first objective is to minimize the glass substrate loss area, and the second objective is to maximize the throughput.

Next, in step S215, the multi-objective planning module 130 establishes a first set of constraints and a second set of constraints, wherein the first set of constraints is the lower limit of the throughput, and the second set of constraints is the upper limit of the glass substrate loss area.

In the first objective, the throughput constraint module 131 limits the throughput to be greater than or equal to a lower limit, so as to minimize the glass substrate loss area.

Similarly, in the second objective, the substrate loss constraint module 132 limits the glass substrate loss area to be smaller than or equal to an upper limit, so as to evaluate the throughput.

Thereafter, in step S220, the capacity planning optimization module 140 respectively calculates the outputs of the first objective and the outputs of the second objective according to the first set of constraints and the second set of constraints.

To be specific, with the minimization of the glass substrate loss area as the objective and the maximum throughput as the limit (the conflictive objective of the first objective), the constraints are sorted from the least strict to the strictest to evaluate the minimum glass substrate loss area in different stages until no feasible plan is produced.

On the other hand, with the maximization of the throughput as the objective and the glass substrate loss area (i.e., the glass substrate loss area, the conflictive objective of the second objective) as the limit, the constraints are sorted from the least strict to the strictest to evaluate the maximum throughput in different stages until no feasible plan is produced.

FIGS. 3A~3C are diagrams illustrating capacity planning results according to an embodiment of the present invention. Referring to FIGS. 3A~3C, FIG. 3A shows the maximum total throughput and the minimum glass substrate loss areas obtained respectively under the first objective and the second objective, and FIGS. 3B and 3C respectively show the capacity planning results obtained by the capacity planning optimization module 140 under the first objective and the second objective. In FIGS. 3B and 3C, the field of "throughput to full-load production" refers to a throughput obtained by subtracting the current throughput from a maximum throughput obtained by using up all the capacity.

In FIG. 3B, the capacity planning optimization module 140 limits the lower limit of the throughput under the objective of minimizing the glass substrate loss area. The field "throughput limit" in FIG. 3B refers to that a plurality of interval values is selected from the throughput between 37,567,240 and 69,903,063 and respectively served as the lower limit of the first set of constraints in the first objective. Taking the interval throughput value 40,000,000 as an example, $$\sum_{pi}\sum_{i}\sum_{j}(a_{i,j}\times X_{p,i,j}\times cn_{i,j}) >= 40{,}000{,}000.$$

With this constraint, the capacity planning optimization module 140 evaluates the throughput to full-load production and the glass substrate loss area under the objective of minimizing the glass substrate loss area and obtains the throughput to full-load production 29,903,063 (panels) and the glass substrate loss area 835,769 (m$^2$). Similarly, the capacity planning optimization module 140 records all the glass substrate loss areas and throughput to full-load production it obtains. After that, the capacity planning optimization module 140 respectively normalizes the throughput to full-load production and the glass substrate loss areas to be between 0 and 1, as the normalized production idleness ratios and the normalized glass substrate loss area shown in FIG. 3B.

Similarly, FIG. 3C shows that the upper limit of the glass substrate loss area is limited under the objective of maximizing the throughput. The field "upper limit of glass substrate loss area" in FIG. 3C refers to that a plurality of interval values is selected from the glass substrate loss areas between 833,940 and 1,070,108 and respectively served as the upper limit of the second set of constraints in the second objective. Taking the interval value 1,000,000 as an example, $$\sum_{p}\sum_{i}\sum_{j}H_{p,i,j}<=1{,}000{,}000.$$

Referring to FIG. 2 again, in step S215, the output module 150 respectively draws a first curve and a second curve in a coordinate graph according to foregoing normalized output values, so as to select an output on the boundaries of the area enclosed by the first curve, the second curve, and the axes X and Y.

Figure 4:
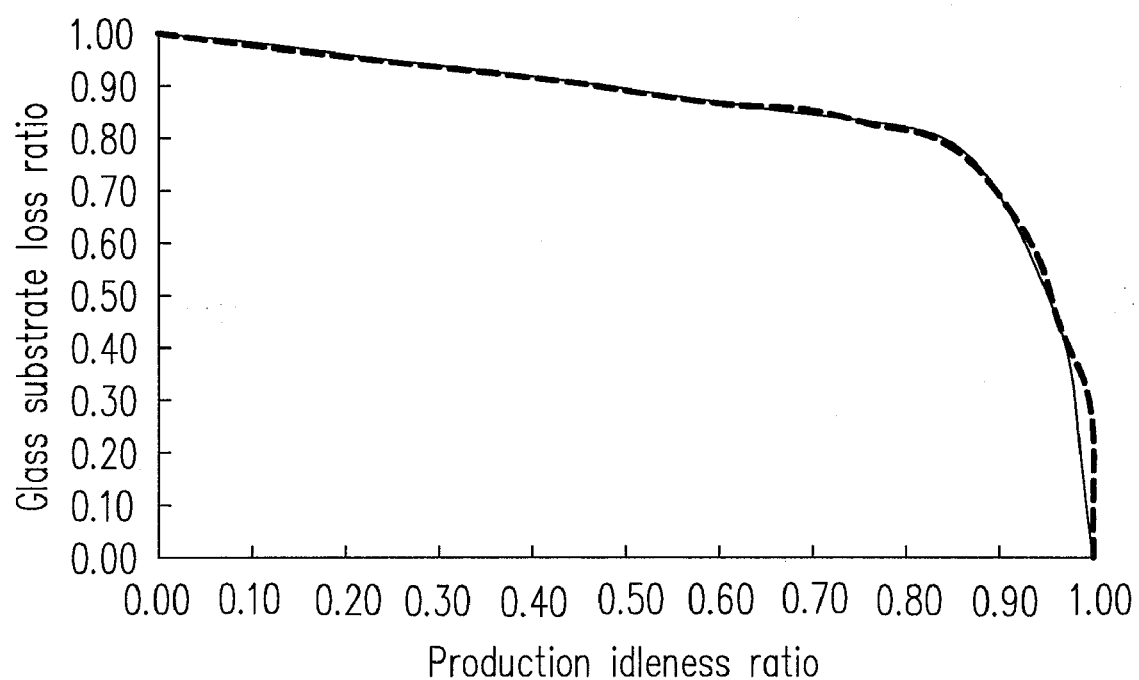
FIG. 4 is a diagram illustrating the relationship between a throughput and a glass substrate loss ratio according to an embodiment of the present invention.

FIG. 4 is a diagram illustrating the relationship between a throughput and a glass substrate loss area. Referring to FIG. 4, the real line is corresponding to the outputs of the first objective, and the dotted line is corresponding to the outputs of the second objective.

By comparing the two curves in the coordinate graph, a decision-maker can selects a point on the boundaries of the area enclosed by the two curves and the axes of the coordinate graph according to the objective combination preference.

As described above, under the consideration of the multiple objectives, a corresponding set of constraints is added into each objective so as to primary optimize the objective so that a decision-maker can select an optimal capacity planning plan accordingly.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A multi-objective capacity planning system in a thin film transistor liquid crystal display (TFT-LCD) panel manufacturing industry, comprising:
   an input module, for inputting multiple characteristic parameters of the TFT-LCD panel manufacturing industry;
   a capacity planning module, for providing a first objective and a second objective and respectively evaluating a throughput and a raw material input according to the characteristic parameters, wherein the first objective is to minimize a glass substrate loss area, and the second objective is to maximize the throughput;
   a multi-objective planning module, for providing a first set of constraints and a second set of constraints to respectively limit the first objective and the second objective, wherein the first set of constraints is a set of lower limits of the throughput, and the second set of constraints is a set of upper limits of the glass substrate loss area;
   a capacity planning optimization module, for respectively calculating outputs of the first objective and outputs of the second objective according to the first set of constraints and the second set of constraints; and
   an output module, for respectively drawing a first curve and a second curve in a coordinate graph according to the outputs of the first objective and the outputs of the second objective and selecting an output on boundaries of an area enclosed by the first curve, the second curve, and axes of the coordinate graph.

2. The multi-objective capacity planning system according to claim 1, wherein the capacity planning module comprises:
   a capacity evaluation module, for limiting an actual capacity to be smaller than or equal to a theoretical capacity, wherein the actual capacity is calculated according to the throughput, an allocation feasibility, and a capacity weight;
   a remaining capacity evaluation module, for evaluating a remaining capacity of TFT-LCD panel manufacturing industry during a current production period, so as to add the remaining capacity to a theoretical capacity of latter production periods;
   a qualified product quantity conversion module, for evaluating a qualified product quantity of the throughput according to a qualified product yield;
   a demand fulfillment evaluation module, for limiting the qualified product quantity to be greater than or equal to a market demand; and
   a substrate loss evaluation module, for evaluating the glass substrate loss area according to the throughput and a substrate cutting utilization ratio.

3. The multi-objective capacity planning system according to claim 2, wherein the multi-objective planning module comprises:
   a throughput constraint module, for limiting the throughput to be greater than or equal to the set of lower limits of the throughput; and
   a substrate loss constraint module, for limiting the glass substrate loss area to be smaller than or equal to the set of upper limits of the glass substrate loss area.

4. The multi-objective capacity planning system according to claim 3, wherein the capacity planning optimization module respectively calculates the outputs of the first objective and the outputs of the second objective by using a optimization tool, wherein the step of calculating the outputs of the first objective and the outputs of the second objective comprises:
   a plurality of first interval values is selected and respectively served as the set of lower limits of the first set of constraints to evaluate the glass substrate loss area of each first interval value, under the first objective of minimizing the glass substrate loss area; and
   a plurality of second interval values is selected and respectively served as the set of upper limits of the second set of constraints to evaluate the throughput of each second interval value, under the second objective of maximizing the throughput.

5. A multi-objective capacity planning method in a thin film transistor liquid crystal display (TFT-LCD) panel manufacturing industry, comprising:

inputting multiple characteristic parameters of the TFT-LCD panel manufacturing industry;

providing a first objective and a second objective, and respectively evaluating a throughput and a raw material input of a panel manufacturing factory according to the characteristic parameters, wherein the first objective is to minimize a glass substrate loss area of the panel manufacturing factory, and the second objective is to maximize the throughput;

establishing a first set of constraints and a second set of constraints to respectively limit the first objective and the second objective, wherein the first set of constraints is a set of lower limits of the throughput, and the second set of constraints is a set of upper limits of the glass substrate loss area;

respectively calculating outputs of the first objective and outputs of the second objective according to the first sub-objective constraint and the second sub-objective constraint; and respectively drawing a first curve and a second curve in a coordinate graph according to the outputs of the first objective and the outputs of the second objective, so as to select an output on boundaries of an area enclosed by the first curve, the second curve, and axes of the coordinate graph.

6. The multi-objective capacity planning method according to claim 5, wherein after the step of providing the first objective and the second objective, the multi-objective capacity planning method further comprises:

limiting an actual capacity to be smaller than or equal to a theoretical capacity, wherein the actual capacity is calculated according to the throughput, an allocation feasibility, and a capacity weight;

evaluating a remaining capacity of TFT-LCD panel manufacturing industry during a current production period, so as to add the remaining capacity to a theoretical capacity of a next production period;

evaluating a qualified product quantity of the throughput, according to a qualified product yield;

limiting the qualified product quantity to be greater than or equal to a market demand; and evaluating the glass substrate loss area according to the throughput and a substrate cutting utilization ratio.

7. The multi-objective capacity planning method according to claim 6, wherein after the step of establishing the first set of constraints and the second set of constraints, the multi-objective capacity planning method further comprises:

limiting the throughput to be greater than or equal to the set of lower limits of the throughput; and limiting the glass substrate loss area to be smaller than or equal to the set of upper limits of the glass substrate loss area.

8. The multi-objective capacity planning method according to claim 7, wherein the step of calculating the outputs of the first objective and the outputs of the second objective comprises:

a plurality of first interval values is selected and respectively served as the set of lower limits of the first set of constraints to evaluate the glass substrate loss area of each first interval value, under the first objective of minimizing the glass substrate loss area and a plurality of second interval values is selected and respectively served as the set of upper limits of the second set of constraints to evaluate the throughput of each second interval value, under the second objective of maximizing the throughput.

9. The multi-objective capacity planning method according to claim 5, wherein the step of respectively drawing the first curve and the second curve in the coordinate graph comprises:

respectively normalizing the outputs of the first objective and the outputs of the second objective to be within a value range; and respectively setting the normalized outputs of the first objective and the normalized outputs of the second objective as a dimension in the coordinate graph, so as to form a point.

* * * * *